Sept. 29, 1953

G. G. LANDIS ET AL 2,654,015

METHOD AND APPARATUS FOR ARC WELDING
USING A PLURALITY OF ELECTRODES

Filed March 1, 1950

INVENTORS
GEORGE G. LANDIS AND
BY NORMAN J. HOENIE

Oberlin + Limbach
ATTORNEYS.

Sept. 29, 1953  G. G. LANDIS ET AL  2,654,015
METHOD AND APPARATUS FOR ARC WELDING
USING A PLURALITY OF ELECTRODES
Filed March 1, 1950  2 Sheets-Sheet 2
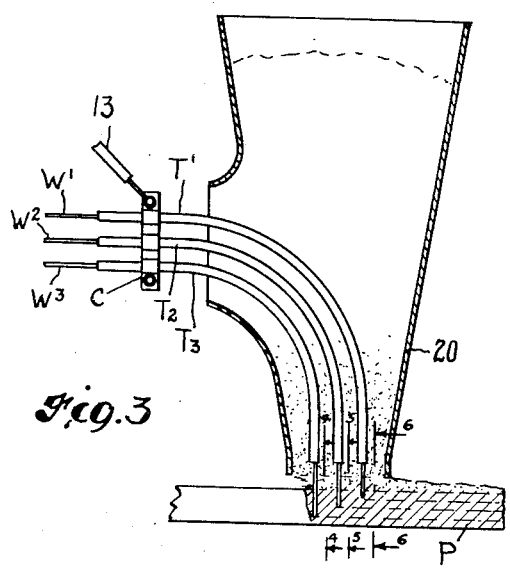
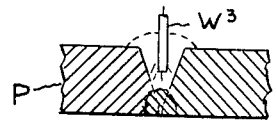
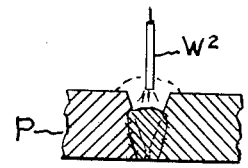
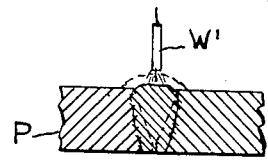
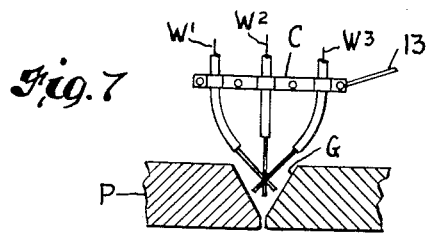
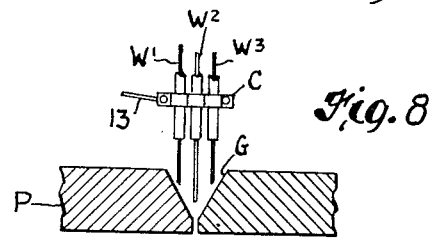
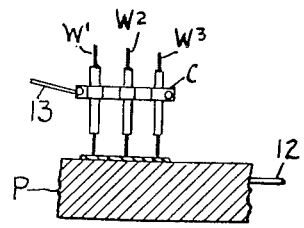
INVENTORS
GEORGE G. LANDIS AND
BY NORMAN J. HOENIE
Oberlin + Limbach
ATTORNEYS.

Patented Sept. 29, 1953

2,654,015

UNITED STATES PATENT OFFICE 2,654,015

METHOD AND APPARATUS FOR ARC WELDING USING A PLURALITY OF ELECTRODES

George G. Landis, South Euclid, and Norman J. Hoenie, Cleveland Heights, Ohio, assignors to The Lincoln Electric Company, Cleveland, Ohio, a corporation of Ohio Application March 1, 1950, Serial No. 147,084

6 Claims. (Cl. 219—10)

The present improvements, relating as indicated to arc welding, have more particular regard to methods of arc welding and apparatus for use in connection therewith in which a metallic electrode or weldrod of indefinite length is employed, such rod or wire being supplied to the point where the arc is struck and the end thereof being melted off incidentally to the welding operation. Still more particularly the present improvements relate to a method of thus arc welding by means of a continuously fed weldrod or wire of indefinite length where two or more such rods or wires are fed to the work simultaneously, while connected in parallel in the welding circuit.

The present application is a continuation in part of our copending patent application Serial No. 749,780, now Patent No. 2,536,294, which patent is, in turn, a continuation in part of our copending patent application Serial No. 538,366 filed June 2, 1944, now Patent No. 2,444,834 dated July 6, 1948.

In U. S. Patent No. 2,320,824 to George G. Landis and L. Keever Stringham, dated June 1, 1943, there is disclosed a method of welding metal parts together wherein the seam to be welded is traversed with two arcs in close sequence, the metal that is rendered molten by one arc being subjected to further fusion by the following arc. However, prior to our present invention it has always been necessary when welding with a plurality of arcs, whether thus operating in sequence or otherwise, that each should be connected independently with the source of welding current since otherwise the operation of one arc would detrimentally affect the operation of the other. More especially, while it would greatly simplify the welding system and apparatus required to include such plurality of arcs in the welding circuit in parallel relation to each other, in all systems and methods heretofore devised it has been found impracticable to maintain the flow of current to the respective arcs in balance. In other words, whether owing to a slight difference in rate of feed of the electrodes to the work-piece or to slight differences in diameter or even composition of the electrodes, one arc would divert the current to such an extent that the other will presently be extinguished.

In U. S. Patent No. 2,444,834 issued to the present applicants under date of July 6, 1948, there is disclosed a method of arc welding in which a continuously fed weldrod or wire of indefinite length has imposed on the terminal portion thereof an arc welding current of sufficiently high density to produce more heat by the resistance heating of such terminal portion than is absorbed by such portion from the arc at such electrode end. As a result of the current density thus employed the end of the electrode is raised substantially instantaneously to the melting point by resistance heating alone so that contact with the work-piece is broken and an arc established between such end and work-piece. We have now discovered that by utilizing the principle of such last described invention, contrary to past experience, it is entirely practicable to weld by means of a plurality of arcs included in the welding circuit in parallel relation to each other. Accordingly, not only may the advantages of plural arc welding as set forth in such first cited Patent No. 2,320,824 be more readily and perfectly achieved, but various new and highly advantageous modifications thereof are made possible.

In accordance with the present invention, there is provided apparatus for and a method of electric arc welding using two or more spaced electrodes with the ends thereof energized with the same welding voltage and of a value such as to cause a current flow in any one electrode should it contact the workpiece of a value sufficient to cause substantially instantaneous fusion of that electrode. While this instantaneous fusion may take its place at various current densities, depending on many factors and conditions such as the metals of the electrode, it has been normal to occur for steel at current densities in any one electrode wire of 60,000 amperes or more per square inch of electrode cross-sectional area.

To the accomplishment of the foregoing and related ends said invention then consists of the means and steps hereinafter fully described and particularly pointed out in the claims.

The annexed drawings and the following description set forth in detail certain means and one mode of carrying out the invention, such disclosed means and mode illustrating, however, but several of the various ways in which the principle of the invention may be used.

In said annexed drawings:

Fig. 3 is a cross-sectional view illustrating a form of flux feeding attachment designed for use with the apparatus illustrated in Fig. 1, the operation of the successive arcs in welding the edges of two juxtaposed work-pieces being at the same time shown in longitudinal cross-section;

Figs. 4, 5 and 6 are transverse cross-sections showing different stages of the welding operation at approximately the points where such successive arcs thus operate, the planes of said sections being indicated by the lines 4—4, 5—5 and 6—6 on Fig. 3;

Fig. 7 is a cross-sectional view similar to those of Figs. 4, 5 and 6, but showing the arcs as operating in spaced transverse as well as longitudinal direction relative to the seam being welded; and Figs. 8 and 9 are views likewise similar to that of Figs. 4, 5, and 6 but each showing still another transverse disposition of the successive arcs.

Figure 1:
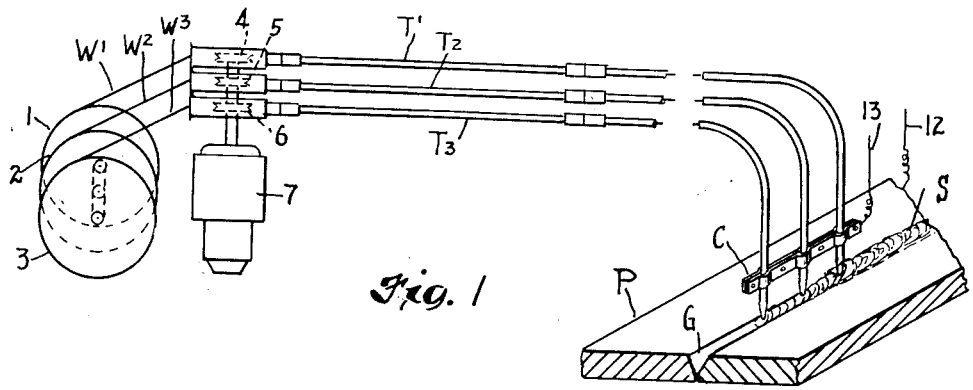
Fig. 1 is a diagrammatic representation of the essential parts of one form of apparatus suitable for carrying out our present improved method.
Figure 2:
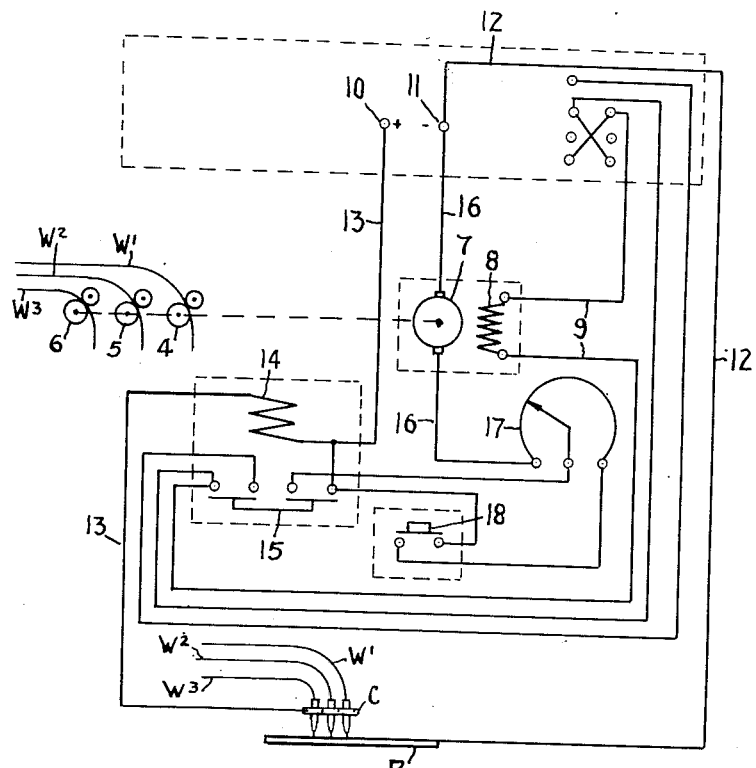
Fig. 2 is a wiring diagram of such form of apparatus.

Referring to the illustrative apparatus shown in Fig. 1 and in accompanying wiring diagram of Fig. 2, it will be seen that provision is made for simultaneously drawing a plurality (three as shown) of weldrods or wires W', W² and W³ from corresponding reels 1, 2 and 3, by means of paired gripping rolls 4, 5, and 6 in conventional manner. Only one of such pair of gripping rolls appears in Fig. 1, such rolls being driven by a motor 7 through a suitable reduction and change speed gear box (not shown) whereby the rate of feed of the several weldrods or wires, which will desirably be all of the same diameter, may be conjointly set to suit such diameter and the requirements of the particular welding operation. The method of welding, as previously indicated, is that disclosed in the above-cited Patent No. 2,444,834, in which by way of specific example the weldrod or wire employed may be of relatively small diameter, e. g. $\frac{1}{16}$ inch to $\frac{5}{64}$ inch, and comparatively high rates of feed are required, e. g. approximately 300 inches per minute for such $\frac{1}{16}$ inch diameter wire and only slightly less for the $\frac{5}{64}$ inch diameter of wire.

As will be more fully brought out later, the number of weldrods or wires employed in a particular operation may be two or more, and the diameter of the weldrods or wires will vary depending upon the number thereof thus used.

Current is supplied to the field 8 (see Fig. 2) of motor 7 through leads 9 from a source of current independent of the welding current, e. g. from an ordinary 120 v. power line. The welding current may likewise be driven from any suitable source, e. g. from the terminals 10 and 11, and the usual means will be provided for varying the voltage and amperage of such current, as may be found desirable for any particular operation. One of the aforesaid terminals, viz. terminal 11 as shown, is connected by means of a lead 12 with the work-piece P, while the other terminal 10 is connected by means of a lead 13 with the plural weldrods or wires W', W², W³ either through conductors which form parts of the flexible tubular guides T', T², T³ which will presently be described or preferably, as shown, directly with the weldrods or wires adjacent their respective ends.

Operation of motor 7 is tied in with the welding operation by a series relay 14 which is operated by the welding current through the electrode lead 13 to close a switch 15 in one of the armature leads 16, an adjustable resistor or rheostat 17 being included in the armature circuit to permit the current therethrough to be set as desired. In addition to this relay there is included in the armature circuit a push button switch 18 which is adapted independently to connect armature lead 16 with lead 13, such switch being used only to operate the motor when not welding, for example in initially threading the weldrods or wires through the tubular guides.

The particular construction of such guides, one of which is provided for each weldrod or wire, forms no part of the present invention. They will, however, ordinarily be flexible, and of such length, as to permit the weldrods or wires to be conveniently guided to the work-piece or pieces where the welding is to be done. In the typical welding operation illustrated in Fig. 1, two such pieces, in the form of plates, are shown with their juxtaposed edges bevelled or chamfered to form a groove G in which material from the electrodes is interfused with that of the plates to form the resulting seam S. While a plurality of leads 13 may be utilized to conduct the welding current to points adjacent the ends of the respective weldrods or wires, in which event such leads will be conveniently incorporated in the corresponding guide tubes, in the apparatus as illustrated a clamp C, connected with the terminal of a single lead 13, it utilized to connect the outer or discharge ends of the guides which in turn have electrical contact with the weldrods or wires as they emerge from such ends. It will thus be seen that the weldrods or wires, or at least the terminal portions thereof through which the welding current passes, will be included in the welding circuit in parallel relation to each other.

We have discovered that where in a welding system as just described a current of sufficiently high density is imposed on the terminal portions of the plural electrodes (weldrods or wires) to produce more heat by the resistance heating of such portions than is absorbed thereby from the arc at the electrode ends, the electrodes may be fed continuously to the work-piece. In other words, under the stated conditions contact between the electrode ends and the workpiece will be broken by the resistance heating of such ends and thus will not only an arc be initially established but continuously maintained between each electrode end and the work-piece, provided the electrodes are fed at the proper rate. Furthermore, this result will not be affected by slight variations in the rate of feed of the individual electrodes, variation in the diameter of the latter, and other factors which have heretofore militated against the use of plural electrodes in arc welding where such electrodes are connected in parallel.

The welding operation will desirably be conducted under a blanket of flux, i. e. a layer of free flowing granular welding composition of sufficient depth to more or less submerge the arc, or in any event produce under the intense heat of the arc a sufficient layer of fused flux or welding composition to protect the fused metal as it is deposited from the electrodes and overlie the resulting seam, all as will be found fully set forth in previously cited Patent No. 2,320,824.

One convenient means for supplying such flux or welding composition is diagrammatically illustrated in Fig. 3, such means consisting of a light weight receptacle or hopper 20 of generally conical form which may be clamped or otherwise attached to the guide tubes so that the lower discharge end of such hopper will surround the ends of the tubes, from which the electrode rods or wires emerge, in closely spaced relation. A desirable arrangement is for the guide tubes to enter such receptacle at one side and then curve downwardly to the discharge opening at the lower end of the receptacle, as clearly shown in Fig. 3. Assuming the receptacle to be filled with flux, which may be of any selected composition, but which will desirably be in free flowing granular form, it will be seen that by maintaining the lower discharge end of such receptacle in proper spaced relation to the surface of the work-piece, or specifically to the groove G between the plates P, as illustrated in Fig. 1, a layer of such material will be deposited in the form of a windrow as such receptacle is moved longitudinally along the line to be welded. It will be understood of course that such movement may equally well be imparted to the work-piece so as to cause the emerging ends of the plural electrodes longitudinally to traverse such line. As a result the juxtaposed edges of the plates will be primarily melted down by the arc and highly heated metal deposited from the first electrode and the seam then be completed by further fusion of such edges and deposit of additional weld metal from successive electrodes, all under cover of the layer of flux or welding composition that is simultaneously deposited from the receptacle 20.

As illustrated in Fig. 3, the ends of the plural electrodes employed in the welding operation just described, and this is also true of the arrangement illustrated in Fig. 1, are in longitudinal alignment with the direction of relative movement between such ends and the work-piece. Accordingly, as further illustrated in the cross-sectional views of the resulting weld shown in Figs. 4, 5 and 6, the seam is built up by successive increments until it is completed.

However, instead of thus longitudinally disposing such ends of the electrodes so that they will follow in succession the line to be welded, or in other words the groove G where such is provided, the electrode ends may be discharged in transverse angular relation to each other, as illustrated in Fig. 7. This may be conveniently accomplished by appropriately curving the discharge ends of one or more of the corresponding guides. As a result, one or more of the arcs between the electrode ends and the work-piece may by directed laterally and thus more effectively interfuse the side walls of the groove. A similar result may be obtained by feeding the electrodes vertically to the plane of the work-piece by spacing them transversely of the line of relative movement between such electrodes and the work-piece, as illustrated in Fig. 8. In each of the arrangements shown in Figs. 7 and 8 it will be understood that in addition to such transversely spaced relation of the electrode ends they will also be spaced longitudinally in a relation similar to that illustrated in Fig. 3. However, in a so-called cladding operation where it is desired to apply to a plate of ordinary steel a layer of alloy steel, the plural electrodes may be spaced transversely only, as illustrated in Fig. 9. In such case the electrodes will be so spaced as to cause the metal as it is deposited from the several electrodes and is interfused with the base metal to flow together or merge so as to form a more or less continuous coat or layer.

From the foregoing description it will be evident that by utilizing an arc welding current of the indicated high density we have rendered it possible to weld simultaneously with a plurality of arcs operated in parallel. In other words, where, as described in our prior Patent No. 2,444,834, such current density is sufficiently high to raise the ends of the several electrodes substantially instantaneously to the melting point by resistance heating alone, contact of any such end with the work-piece is immediately broken by the resulting fusion of the end and an arc is established between the latter and the work-piece. Accordingly, there will be no occasion, despite their parallel relationship, for any one of the series of arcs thus established to be put out or for the corresponding electrode end to freeze to the work-piece. The welding operation using such plural arcs proceeds smoothly even where the number is increased beyond the three illustrated in the drawings.

Not only is our present improved method highly advantageous in welding with plural arcs which follow in close succession the line to be welded, but, as illustrated in Figs. 7, 8 and 9 of the drawings, the arcs may operate in spaced relation transversely of the line of traverse relatively to the work-piece.

Furthermore, in any of the foregoing arrangements of the plural weld wires, or electrodes, the composition of the latter may vary inter se. Thus where arranged in longitudinally spaced relation to the seam being welded, the electrode in advance may be made of mild steel, which will provide a penetrating arc, and a following electrode of high carbon steel, which will provide an arc of less penetrating character. Furthermore, such second electrode may include sufficient carbon to provide a protective atmosphere by the burning out of its carbon content.

It will be understood of course that while the welding operation will preferably be conducted under a deep layer of flux, our improved method is not limited in this respect but such flux as may be required may be applied as a thin layer along the line to be welded or may be carried by the weld wire itself. It should be noted that where the latter is of the small diameter indicated in the examples hereinabove given, a coating of flux thereon having given thickness will provide a greater amount of flux per unit of wire than where applied in a coating of the same thickness to a weld wire or rod of larger diameter. In other words, more flux per unit of electrode melt-off may be provided without encumbering the electrode with an unduly heavy flux coating.

The following examples will serve as specific illustrations of current densities that may be employed in carrying out the present improved method or process, the reference of course being to the density of the arc welding current imposed on the individual weld rod or wire. Thus taking a weldrod or wire of 3/64" d., a current of 400 a. and approximately 40 v. at the arc, such wire will be fed at the rate of 470 inches per minute, giving a wire burn-off of 0.23 lb. per minute. With a current of 500 a. and somewhat higher voltage, e. g. 45–48 v., the rate of feed of the same 3/64" d. wire will be 920 inches per minute giving a wire burn-off of 0.45 lb. per minute. Similarly taking 1/16" d. wire and a current of 500 a. and arc voltage of approximately 40 v., the rate of feed will be 290 inches per minute, giving a wire burn-off of 0.25 lb. per minute; while at 600 a. and voltage of approximately 45, the rate of feed will be 440 inches per minute, giving a wire burn-off of 0.40 lb. per minute.

The current density in amperes per square inch for the foregoing specific illustrations will upon calculation be found to be as follows, viz.:

| Electrode Diameter, inches | Current, Amperes | Current Density, Amperes Per Square Inch |
|---|---|---|
| 3/64 | 400 | 230,000 |
| 3/64 | 500 | 290,000 |
| 1/16 | 500 | 160,000 |
| 1/16 | 600 | 200,000 |

In general, it may be stated that our improved process is characterized by a rate of electrode feed in excess of ten feet per minute, and by the employment of a current value sufficiently high so that the welding circuit between the work and electrode may be maintained for a period longer than one second only by feeding the electrode toward the work.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of arc welding wherein an arc is established between a metallic work-piece and the end of a metallic electrode, the steps which comprise simultaneously feeding to the work-piece a plurality of said electrodes in spaced relation to each other, and simultaneously supplying to the terminal portions of all said electrodes adjacent the arc ends thereof the same welding voltage, the current, as a result of such voltage, being effective to cause substantially instantaneous fusion of such end of any one of said electrodes whenever such end comes into contact with said work-piece and said electrodes being thus electrically connected in the welding circuit in parallel relation to each other.

2. In a method of arc welding wherein an arc is established between a metallic work-piece and the end of a metallic electrode, the steps which comprise simultaneously feeding to the work-piece a plurality of said electrodes in spaced relation to each other, and simultaneously supplying to the terminal portions of all said electrodes adjacent the arc ends thereof the same welding voltage, the current, as a result of such voltage, being effective to cause substantially instantaneous fusion of such end of any one of said electrodes whenever such end comes into contact with said work-piece, said electrodes being electrically connected in the welding circuit in parallel relation to each other and such ends of said electrodes being arranged in both longitudinally and transversely spaced relation to the seam being welded.

3. In a method of arc welding, the steps which comprise establishing a plurality of arcs between a corresponding number of spaced apart metallic electrodes and a metallic work-piece, said arcs being electrically connected in parallel relation, and simultaneously, continuously feeding such electrodes towards such work-piece at approximately the same uniform rate while continuously supplying to the terminal portions of all such electrodes the same arc welding voltage, the current, as a result of such voltage, being of at least 60,000 amperes per square inch of normal electrode cross-section whereby such end whenever it comes in contact with such work-piece is raised to the melting point by resistance heating alone, contact with the work-piece is broken and an arc established between such end and work-piece.

4. In a method of arc welding, the steps which comprise establishing a plurality of arcs between a corresponding number of spaced apart metallic electrodes and a metallic work-piece, said arcs being electrically connected in parallel relation, and simultaneously, continuously feeding such electrodes towards such work-piece at approximately the same uniform rate while continuously imposing on the terminal portions of all such electrodes the same arc welding voltage, the current, as a result of such voltage, being of sufficiently high density to cause substantially instantaneous fusion of the end of any one of said electrodes whenever such end comes into contact with such work-piece.

5. In a method of arc welding, the steps which comprise establishing a plurality of arcs between a corresponding number of spaced apart metallic electrodes and a metallic work-piece, said arcs being electrically connected in parallel relation, and simultaneously, continuously feeding all such electrodes towards such work-piece at approximately the same uniform rate while continuously imposing on the terminal portions of such electrodes the same arc welding voltage, the current, as a result of such voltage, being of sufficiently high density to produce more heat by the resistance heating of such terminal portion of each electrode than is absorbed by such portion from the arc at such electrode end.

6. Electric arc-welding apparatus of the type wherein an arc is established between a metallic work-piece and the end of a metallic electrode and the electrode is continuously advanced toward the work-piece as the electrode is melted away, said apparatus comprising, in combination, a plurality of wire electrodes of indeterminate length, means for simultaneously feeding said electrodes in spaced relationship to each other toward a work-piece and means for electrically energizing the terminal portions of all of said electrodes adjacent the arc ends thereof with the same welding voltage, such voltage having a value to cause a current to flow in the electrodes to cause substantially instantaneous fusion of any one of the ends of the electrodes whenever such end comes into contact with a work-piece.

GEORGE G. LANDIS.
NORMAN J. HOENIE.

References Cited in the file of this patent

UNITED STATES PATENTS

| Number | Name | Date |
|---|---|---|
| 1,340,056 | Kenyon | May 1, 1920 |
| 1,371,094 | Holslag | Mar. 8, 1921 |
| 1,834,069 | Miller | Dec. 1, 1931 |
| 2,083,309 | Applegate | June 8, 1937 |
| 2,191,470 | Hopkins | Feb. 27, 1940 |
| 2,226,403 | Hopkins | Dec. 24, 1940 |
| 2,241,572 | Armstrong | May 13, 1941 |
| 2,299,747 | Harter | Oct. 27, 1942 |
| 2,320,824 | Landis et al. | June 1, 1943 |
| 2,405,673 | Scherl | Aug. 13, 1946 |
| 2,444,834 | Landis et al. | July 6, 1948 |
| 2,494,718 | Palmer | Jan. 17, 1950 |

FOREIGN PATENTS

| Number | Country | Date |
|---|---|---|
| 609,848 | Germany | Feb. 26, 1935 |